United States Patent [19]

Angleman

[11] 3,968,299

[45] July 6, 1976

[54] TWO-WAY, SELECTIVE DIRECTIONAL, IMAGE-TRANSFER SHEET

[76] Inventor: John D. Angleman, 46 E. Main St., Brookside, N.J. 07926

[22] Filed: Feb. 21, 1975

[21] Appl. No.: 551,922

[52] U.S. Cl. .............................. 428/307; 282/27 A; 428/323

[51] Int. Cl.² ........................ B32B 5/16; B41L 1/20

[58] Field of Search ........... 428/323, 152, 913, 207, 428/307; 282/27 R, 27 A, 28

[56] References Cited

UNITED STATES PATENTS

| | | | |
|---|---|---|---|
| 2,548,366 | 4/1951 | Green et al. | 282/28 R |
| 2,550,469 | 4/1951 | Green et al. | 282/28 R |
| 2,618,573 | 11/1952 | Green | 282/28 R |
| 3,769,057 | 10/1973 | Lin | 428/307 |
| 3,769,062 | 10/1973 | Ishige et al. | 428/307 |
| 3,825,467 | 7/1974 | Phillips | 428/307 |

*Primary Examiner*—Marion E. McCamish
*Assistant Examiner*—P. J. Thibodeau
*Attorney, Agent, or Firm*—Sherman & Shalloway

[57] ABSTRACT

A directional, image-transfer paper having multiple reagents for image reproduction and screening means for selectively releasing one of the reagents only in the direction of impact of the image-producing implement.

5 Claims, 4 Drawing Figures

TWO-WAY, SELECTIVE DIRECTIONAL, IMAGE-TRANSFER SHEET

BACKGROUND OF THE INVENTION

The present invention relates to image-transfer sheets for multiple-record service and is concerned, more particularly, with image-transfer papers for use in sets which are capable of impact-transfer of images on both faces of the paper selectively and only in the direction of the impacting instrument so that differing records may be applied on opposite sides of manifold sets without backprinting in the direction opposite the direction of the impacting instrument.

BRIEF DESCRIPTION OF THE PRIOR ART

A variety of attempts have been made in the development of "non-carbon" papers for use in manifolded sets which are secured at one edge to avoid the need for assembly of such sets, by the user, and to avoid the problem of smudging or smearing which is typical of carbon-type transfer sheets.

A particularly effective image transfer paper is typified in a series of patents to Barrett K. Green, including U.S. Pat. Nos. 2,548,366; 2,550,466; 2,550,467 and 2,618,573. Typically, these papers are mutually sensitized by the presence of image-forming reactants on adjacent sheet surfaces, at least one of the reagents being microencapsulated to avoid unintentional reaction between the reagents. The pressure or pinching of local areas of the papers, such as by a typewriter key and platen, is relied upon to rupture and free the microencapsulated reagent in the impact area, thereby causing the desired image transfer to the subjacent sheet. These non-carbon papers have proven generally satisfactory and have enjoyed commercial success, both in the simpler two-sheet sets and in manifolds in which several imaged copies are desired.

However, the non-carbon papers heretofore available have been limited to the application of images to only one side of the sheet or form, since the transfer of the imaging reactants has not been directionally controllable and, therefore, results in backprinting on the "back" of the sheet from the surface on which the image is desired, if used on the "wrong" side.

This backprinting will confuse or make illegible a subsequently desired image on the back surface, consequently precluding the use of both sides of the assembled papers. Therefore, these papers have made necessary the use of excessive numbers of sheets and have resulted in considerable costs not only for the papers themselves but also for the filing or storage of such one-side-only records.

Therefore, the prior non-carbon sheets or papers have not been found to be entirely satisfactory.

SUMMARY OF THE INVENTION

In general, the preferred image-transfer sheet of the present invention comprises a base sheet having mutually-reactive image reagents applied on opposite sides of the base sheet, and screening means for preventing reagent transfer between adjacent sheets except in the direction of impact of the image-producing instrument. In the preferred embodiment, the screening means includes a screening layer of material which will release reagent matter through its interstices when said screening layer is distended to an outwardly convex position but retains said reagent therein when the screening layer is compressed in an outwardly concave position.

It is an object of the present invention to provide an image-transfer sheet which is capable of an imaging reaction with an adjacent sheet without backprinting.

It is a further object of the present invention to provide an image-transfer sheet which is capable of an imaging reaction with an adjacent sheet selectively in the direction of pressure applied by an imaging instrument.

A further object of the present invention is the provision of an imaging sheet which is capable of an imaging reaction with an adjacent sheet on either side selectively in the direction of pressure applied by an imaging instrument.

A further object of the present invention is the provision of an image transfer sheet having image-forming reactants on opposite faces and screening means to permit donation of image-forming reactants to an adjacent sheet only in the direction in which pressure is applied by an imaging instrument.

A still further object of the present invention is the provision of image-transfer sheets in sets which are capable of receiving and transferring images in two directions without backprinting.

An additional object of the present invention is the provision of image transfer sheet in sets which are capable of receiving and transferring images in opposite directions selectively in the direction in which pressure is applied by an imaging instrument.

BRIEF DESCRIPTION OF THE DRAWINGS

These and other objects of the invention and a better understanding thereof may be derived from the following description and the accompanying drawings, in which.

DETAILED DESCRIPTION OF PREFERRED EMBODIMENT

Figure 1:
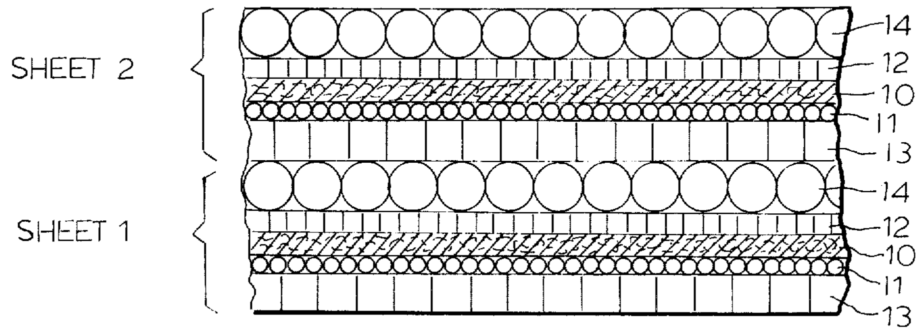
FIG. 1 is a schematic representation of a transverse section of two image-transfer sheets in accordance with a preferred embodiment of the invention.

As shown in the drawings, the preferred form of the present invention comprises image-transfer sheets 1 and 2 which may be associated in sets of two or more, as desired. The sheets each include a base sheet 10 of paper or other suitable material which carries a coating on each face A and B. The faces A and B each include a donor zone 11 and 12, respectively, inwardly of an acceptor and screening zone or layer 13 and 14, respectively.

For convenience in understanding, the structure and the components of the faces A and B have been shown schematically by means of circles and squares of different sizes. It is to be understood, however, that these geometrical shapes are not definitive of the nature of the structure or the inclusions within the image transfer sheets.

The base sheets 10 are provided with a pair of mutually reactant image forming reagents C and c which are respectively present in the screening zone 14 and the donor of zone 11 and which are separated from each other by the base sheet 10'. Similarly, a pair of mutually-reactive reagents D and *d* are present in the screening zone 13 and the donor zone 12, respectively, on opposite sides of the base sheet 10.

The reagent pairs C/*c* and D/*d* preferably have at least one of each pair in a microencapsulated form such as taught in the aforementioned patents to Barrett K. Green. However, it is important that the image-forming reactant pairs be inert with regard to the components of the other reagent pair, and with regard to the remaining components of the sheet, so that they will react to form an image only with the other component of their reactant pair. Therefore, C is inert except with regard to *c* and vice versa, while D is inert except with regard to *d*, and vice versa.

The faces A and B are of a color and surface capable of receiving legibly either a direct image, such as from a typewriter, or a transferred image donated from an adjacent sheet. Therefore, I prefer to form the screening zones 13 and 14 with a different component of one of the reactant pairs C/*c* and D/*d*. While these receiving and screening layers 13 and 14 preferably are formed by discrete, adhering particles of the reagents C and D, it is to be understood that the reactants may be associated with other particles or structure which will exhibit a screening function, as will be discussed more fully hereinafter.

OPERATION OF THE PREFERRED EMBODIMENT

Figure 2:
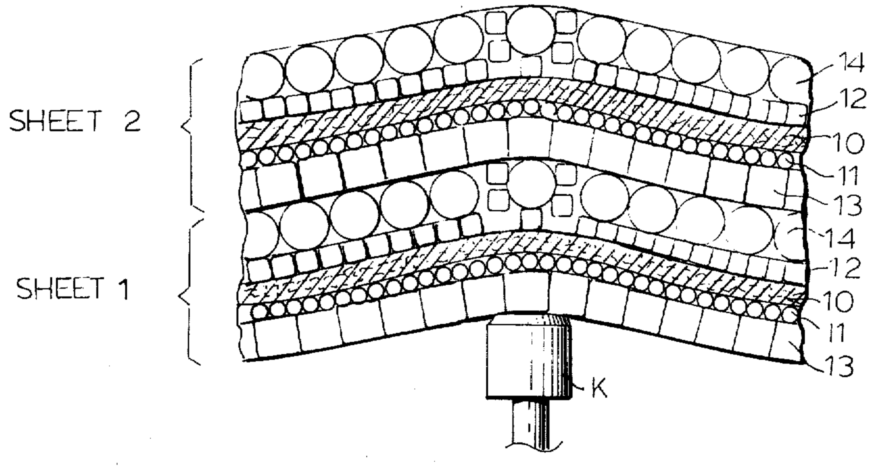
FIG. 2 is a view similar to FIG. 1 and schematically showing the transfer of an image in a first direction.

In use, two or more sheets are associated as shown and are then engaged by an imaging instrument such as a pen or a typewriter key K. This is represented in FIG. 2 in which the key K is shown engaging face A of sheet 1. A typewriter ribbon may be employed for the primary imaging on face A of sheet 1, but has not been shown here for reasons of simplicity.

Figure 4:
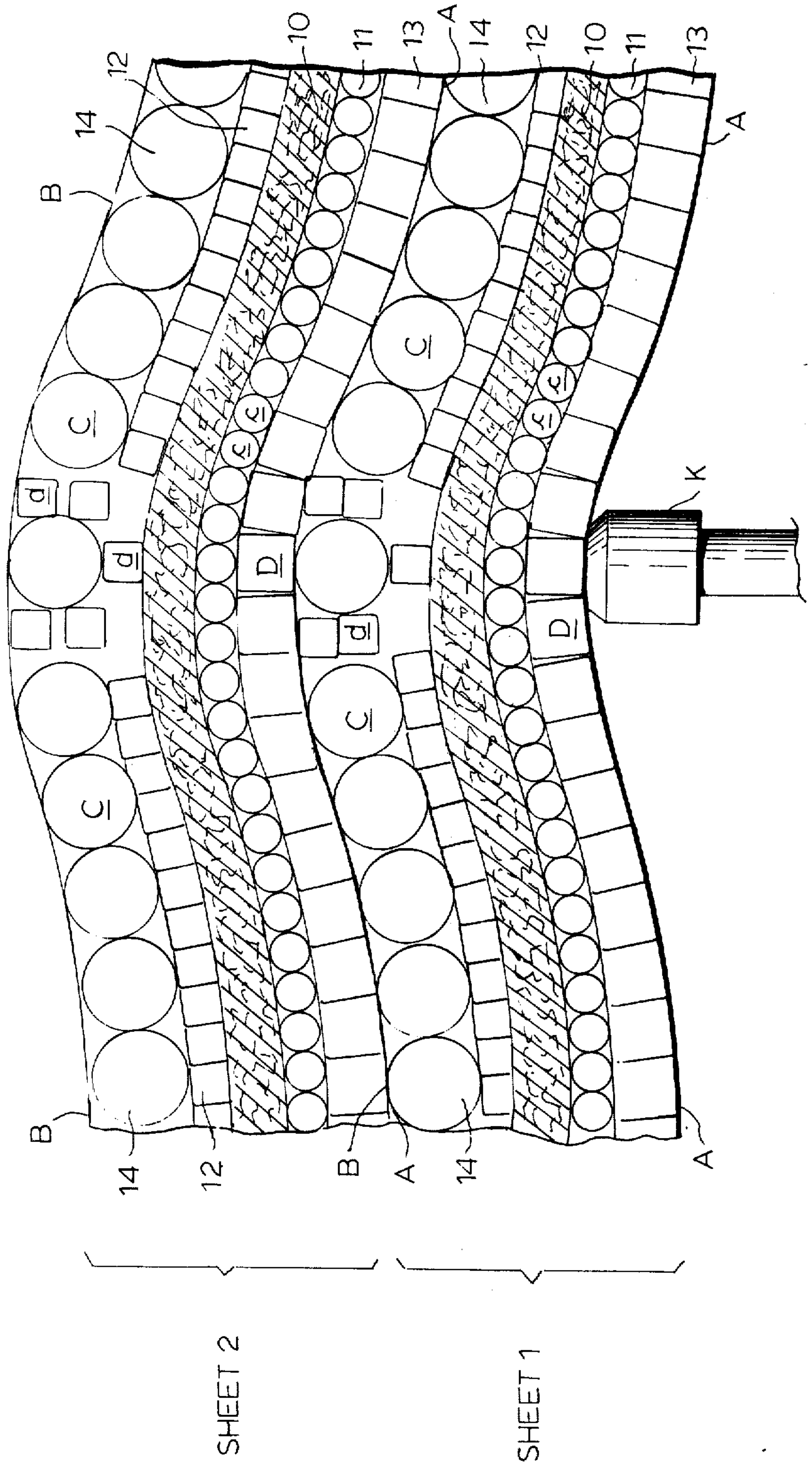
FIG. 4 is an enlarged view of a portion of FIG. 2.

The pressure of the key K forces a concavity in face A of sheet 1 and a resultant convexity of the opposite face B of sheet 1, as best shown in FIG. 4. The convexity of the pressure zone of face B, sheet 1, imposes a concavity in the underlying zone of face A, sheet 2 and, possibly, a convexity of the underlying face B of sheet 2, depending on the resilience of the underlying surface. A yielding typewriter platen will permit a degree of such convexity, for example.

The distension or expansion of the face B of sheet 1 permits escape of the reactant *d* through the interstices of the screen layer 14 and consequent transfer of the reactant *d* onto the surface A of sheet 2. The presence of the companion reactant D in surface A of sheet 2 causes a discoloration on that surface corresponding to the shape of the pressure zone or impact zone of the key K. If additional sheets were stacked behind sheet 2, similar images would be transferred to their A surfaces by the transfer of reactant *d* from their respective donor layers 12 and D/*d* reaction on their A faces.

It is important to note that the compression of the screen layers 13 into outwardly-concave positions closes the screen layers at the A faces of the respective sheets. Therefore, the pressure of the key K closes the screen layer 13 of sheet 2 and prevents backprinting on face B, sheet 1, since the reagent *c* in layer 11 of sheet 2 is screened from contact with the reactant C in face B of sheet 1.

Figure 3:
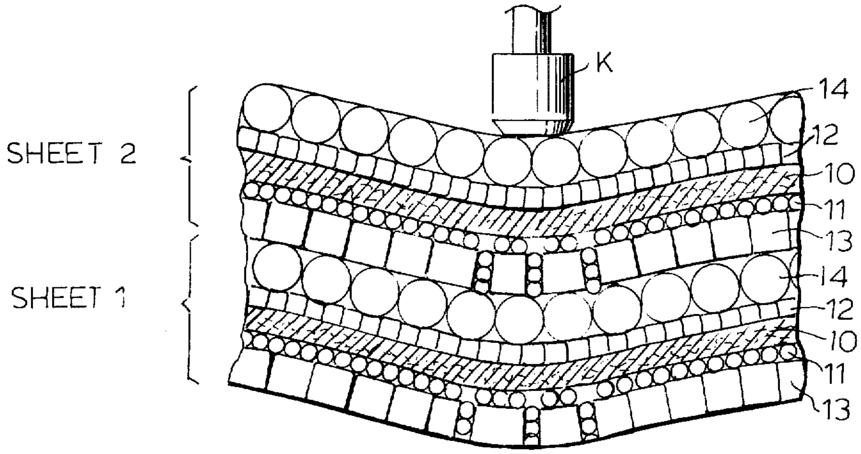
FIG. 3 is a view similar to FIG. 2 and showing the sheets arranged for image transfer in a second direction.

When all desired images have been imposed on the A sides of the sheets, the assembled sheets are reversed, without reassembly, in the typewriter, as represented in FIG. 3.

Subsequent key pressure on face B of sheet 2 causes the screening layer 13 of sheet 2 to distend or deform into a convex shape and to release or donate reactant *c* to the surface B of sheet 1, thereby transferring the desired image. At the same time, compression of the screen 14 of sheet 1 precludes backprinting release of the reactant *d* through the screen 14 to what is then back face A of sheet 2.

The screening layers 13 and 14 preferably are of the nature of molecular sieves and arranged to pass only their appropriate donor reactant *c* or *d* when they are physically distended into convexity by the pressure of the key K. I prefer to employ bonded particles in the formation of the sieve layers and to secure the appropriate donor reactants *c* or *d* in rupturable microcapsules between the base layer and the screening layer, including the inward interstices of the screening layer. It is important to note that, even if the *c* or *d* microcapsules are ruptured by any pressure, their contents cannot escape the zone between the base layer and the screening layer unless the adjacent screening layer is distended into convexity by an imaging instrument.

However, it is to be understood that the selective donation of reactants may be accomplished by other means, such as an inert, overlying layer or structure, or by any structure or securing means which will effect selective release and donation of the reactant only upon distension of the securing surface into a convex shape.

The particular image-transfer agents or color reactants, and especially the particular colors they exhibit are not of critical importance to the present invention, since the desired colors will be a matter of selection with regard to the color of the face upon which their image is to be formed.

Therefore, various changes may be made in the details of the invention, as disclosed, without sacrificing the advantages thereof or departing from the scope of the appended claims.

I claim:

1. An image forming and transferring sheet comprising
 a base sheet having
 a first face and
 a second face, each of said faces having
 image transfer means for transferring an image to an adjacent sheet, said image transfer means including
 an image forming agent on each of said faces, and
 means for securing said image forming agents on said sheet for release only in a preselected direction of pressure by an imaging instrument, said securing means including screening means normally occluding passage of said image forming agents until distention thereof into an outwardly convex shape by an imaging instrument.

2. The image sheet of claim 1 in which said screening means includes discrete particles.

3. The image sheet set forth in claim 1 in which said image-forming agents comprise first and second pairs of mutual image-forming reactants, the mutual reactants of each pair being positioned on opposite sides of said base sheet.

4. The image sheet set forth in claim 3 in which at least one reactant of each pair is microencapsulated.

5. The image sheet set forth in claim 4 in which each of said image forming reactants are inert with respect to the adjacent reactant of the other pair on the same side of the base sheet.

* * * * *